(12) United States Patent
Ur

(10) Patent No.: US 9,020,468 B2
(45) Date of Patent: Apr. 28, 2015

(54) MASKING PHONE NUMBERS

(75) Inventor: Shmuel Ur, Shorashim (IL)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/497,671

(22) PCT Filed: Dec. 29, 2011

(86) PCT No.: PCT/US2011/067786
§ 371 (c)(1),
(2), (4) Date: Mar. 22, 2012

(87) PCT Pub. No.: WO2013/101036
PCT Pub. Date: Jul. 4, 2013

(65) Prior Publication Data
US 2013/0171969 A1    Jul. 4, 2013

(51) Int. Cl.
*H04W 12/02* (2009.01)
*H04M 3/42* (2006.01)

(52) U.S. Cl.
CPC .................................. *H04M 3/42008* (2013.01)

(58) Field of Classification Search
CPC ....................................................... H04W 12/02
USPC ........................................ 455/411, 415, 410
See application file for complete search history.

(56) References Cited

U.S. PATENT DOCUMENTS

| | | | |
|---|---|---|---|
| 5,257,399 A | 10/1993 | Kallin et al. | |
| 5,577,172 A | 11/1996 | Vatland et al. | |
| 6,064,887 A * | 5/2000 | Kallioniemi et al. | 455/445 |
| 7,369,839 B2 * | 5/2008 | Haumont et al. | 455/403 |
| 7,469,043 B1 * | 12/2008 | McDonald et al. | 379/202.01 |
| 7,941,140 B2 * | 5/2011 | Grayson et al. | 455/432.1 |
| 7,944,870 B2 * | 5/2011 | Varland | 370/313 |
| 2002/0187746 A1 * | 12/2002 | Cheng et al. | 455/11.1 |
| 2003/0027581 A1 * | 2/2003 | Jokinen et al. | 455/456 |
| 2003/0198326 A1 | 10/2003 | Wei | |
| 2005/0032546 A1 * | 2/2005 | Kehr | 455/551 |
| 2007/0280138 A1 * | 12/2007 | Stern | 370/254 |
| 2008/0070560 A1 * | 3/2008 | Ishii et al. | 455/417 |
| 2008/0261571 A1 | 10/2008 | Zellner et al. | |
| 2009/0209233 A1 * | 8/2009 | Morrison | 455/411 |
| 2010/0197343 A1 * | 8/2010 | Sato et al. | 455/551 |
| 2011/0159861 A1 * | 6/2011 | Pratt et al. | 455/417 |
| 2011/0258287 A1 * | 10/2011 | Anderson | 709/217 |
| 2011/0294506 A1 * | 12/2011 | Claussen et al. | 455/435.1 |
| 2012/0275442 A1 * | 11/2012 | Malets et al. | 370/338 |
| 2012/0289205 A1 * | 11/2012 | Burgess | 455/414.1 |

OTHER PUBLICATIONS

"Protocols Using Anonymous Connections: Mobile Applications" by M. Reed, et al., Naval Research Laboratory, Report date: 1997.

(Continued)

*Primary Examiner* — Jinsong Hu
*Assistant Examiner* — Jean Chang
(74) *Attorney, Agent, or Firm* — Brundidge & Stanger, P.C.

(57) ABSTRACT

In one example of masking phone numbers, a roster of changeable phone numbers may be assigned to a target phone, a presence of the target phone may be registered to a local cell site, a request for one of the changeable phone numbers that is assigned to the target phone for a current time frame may be received, and a phone call that is intended for the target phone may be facilitated using an assigned one of the changeable phone numbers that is assigned to the target phone for the current time frame.

16 Claims, 6 Drawing Sheets

(56) References Cited

OTHER PUBLICATIONS

"Mobile phone tracking," accessed at http://web.archive.org/web/20101027192524/http://en.wikipedia.org/wiki/Mobile_phone_tracking, last modified on Oct. 27, 2010, pp. 1-4.
"Prepaid mobile phone," accessed at http://web.archive.org/web/20111123182929/http://en.wikipedia.org/wiki/Prepaid_mobile_phone, last modified on Nov. 20, 2011, pp. 1-6.
"Tell-all telephone," accessed at http://web.archive.org/web/20111226173125/http://www.zeit.de/datenschutz/malte-spitz-data-retention, accessed on Sep. 9, 2014, p. 1.
"Tigits Launches in Toronto—New Service Provides Second, Changeable and Totally Anonymous Phone Numbers for Greater Safety and Privacy," accessed at http://web.archive.org/web/20111122115840/http://www.prweb.com/releases/2011/01/prweb4979434.htm, Press release on Jan. 19, 2011, pp. 1-2.
"Voice over IP Offers Your Business an Inexpensive Alternative to Toll Free Numbers," accessed at http://web.archive.org/web/20121130101544/http://telephonation.com/articles/voip/13449.php, accessed on Sep. 9, 2014, pp. 1-4.
Ackerman, S., "Meet the 'Keyzer Soze' of Global Phone-Tracking," accessed at http://web.archive.org/web/20140711021311/http://www.wired.com/2011/07/global-phone-tracking/, posted on Jul. 18, 2011, pp. 1-12.
Dwyer, J., "It's Not Just Drug Dealers Who Buy Prepaid Phones," accessed at http://web.archive.org/web/20111206002405/http://www.nytimes.com/2010/05/30/nyregion/30about.html, posted May 28, 2010, pp. 1-3.
Gamet, J., "GSMA Approves Apple-style Programmable SIM Cards," accessed at http://web.archive.org/web/20101120230232/http://www.macobserver.com/tmo/article/gsma_approves_apple-style_programmable_sim_cards/, posted Nov. 18, 2010, pp. 1-2.
Gilmer, C., "Create a temporary phone number with inumbr," accessed at http://web.archive.org/web/20111228211433/http://hackaday.com/2009/09/09/create-a-temporary-phone-number-with-inumbr/, posted on Sep. 9, 2009, pp. 1-9.
International search report and written opinion for PCT application No. PCT/US2011/067786 mailed on Mar. 20, 2012.
James, "GSMA approves embedded programmable SIM cards: Apple to make iPhone unlocking impossible?," accessed at http://web.archive.org/web/20101207111101/http://www.iphoneworld.ca/news/2010/11/18/gsma-approves-embedded-programmable-sim-cards-apple-will-make-iphone-unlocking-impossible/, posted on Nov. 18, 2010, pp. 1-6.
Kong, H., "GSMA Launches Embedded SIM Initiative to Support the Connected Future," accessed at http://web.archive.org/web/20111113025114/http://gsmworld.com/newsroom/press-releases/2010/5726.htm, posted on Nov. 18, 2010, pp. 1-2.
Marks, P., "Protecting protestors with photos that never existed," accessed at http://web.archive.org/web/20111206221337/http://www.newscientist.com/article/mg21128195.500-protecting-protestors-with-photos-that-never-existed.html, posted Jul. 7, 2011, pp. 1-2.
Musil, S., "New service unmasks anonymous cell callers," accessed at http://web.archive.org/web/20101201084508/http://news.cnet.com/8301-1035_3-10166455-94.html, posted on Feb. 17, 2009, pp. 1-4.
Reed, M.G., et al., "Protocols using Anonymous Connections: Mobile Applications," Lecture Notes in Computer Science, Security Protocols, vol. 1361, pp. 13-23 (1998).
Xu, J., "iPDA: Privacy-Preserving Location-based Data Access in Mobile Environments," accessed at http://web.archive.org/web/20101025083202/http://www.comp.hkbu.edu.hk/~xujl/research/ipda.html, accessed on Sep. 9, 2014, p. 1.

* cited by examiner

MASKING PHONE NUMBERS

CROSS-REFERENCE TO RELATED APPLICATIONS

This Application is the National Stage filing under 35 U.S.C. §371 of PCT Application Ser. No. PCT/US11/67786 filed on Dec. 29, 2011. The disclosure of the PCT Application is hereby incorporated herein by reference in its entirety.

BACKGROUND

For myriad reasons, which may be rooted in purposes of a personal or corporate nature, technical anonymity may be desirable. However, such anonymity may be difficult to attain in an era in which, e.g., caller identification ("caller ID") is no longer an add-on service, but is rather a standard feature for the vast majority of all telephone services. Previous efforts to attain such anonymity, particularly with regard to telephone services, include caller ID spoofing, which has been available for a long time to people with a specialized digital connection to the telephone company.

SUMMARY

In one example embodiment, a computer-readable medium stores one or more executable instructions that, when executed, cause one or more processors to receive a roster of changeable phone numbers that are assignable to a target phone, register a presence of the target phone to a local cell site, receive a request for one of the changeable phone numbers that is assigned to the target phone for a current time frame, and facilitate a phone call intended for the target phone at an assigned one of the changeable phone numbers that is assigned to the target phone for the current time frame.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
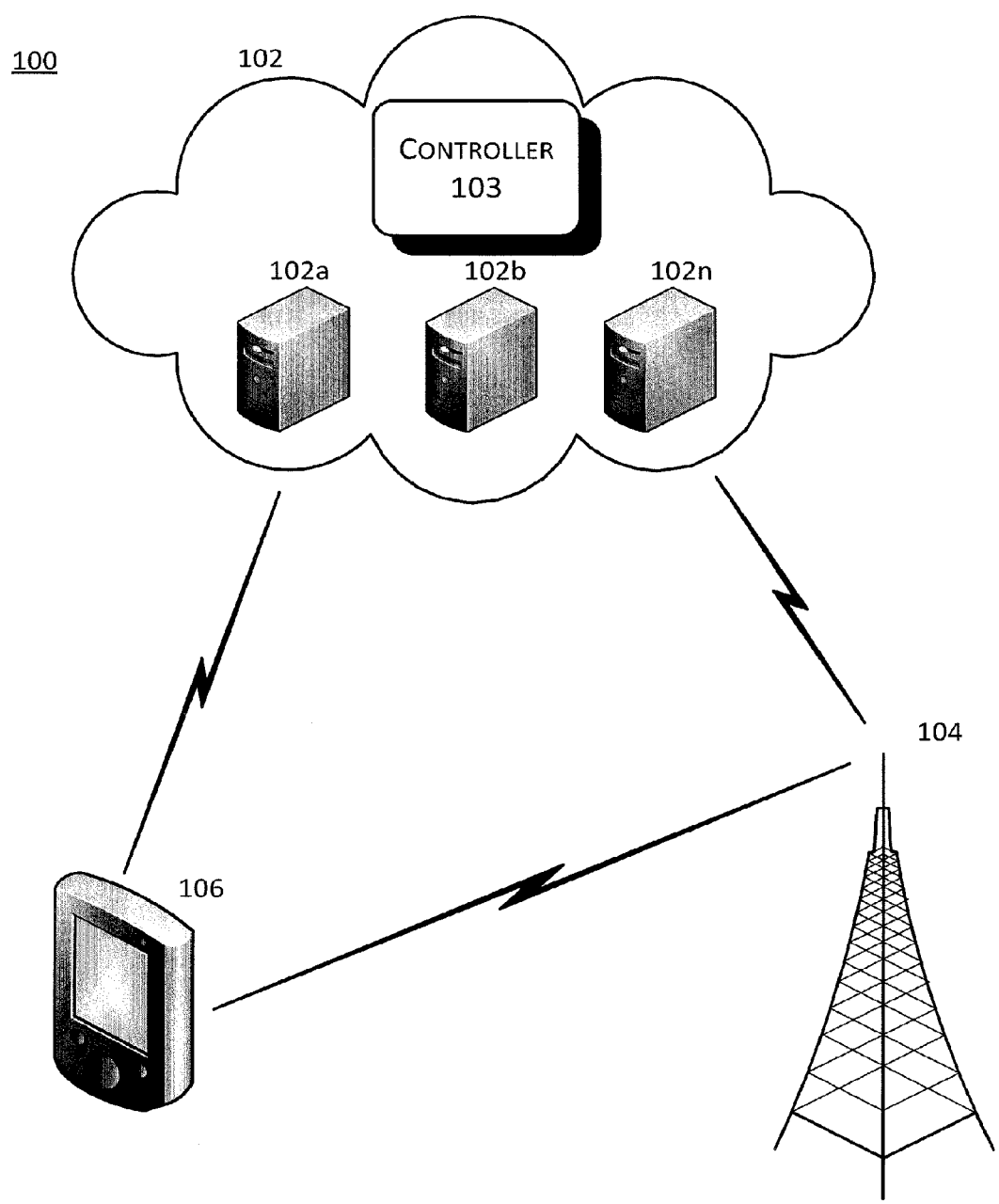
FIG. 1 shows an example communication system configuration in which masking phone calls may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an example communication system configuration 100 in which masking phone calls may be implemented, arranged in accordance with at least some embodiments described herein. As depicted, communication system configuration 100 includes a service 102, a cell site 104, and a mobile phone 106.

Service 102 may refer to a third-party service that is configured to implement at least portions of masking phone numbers. Service 102 may be configured as, at least, a series of servers 102a, 102b, . . . , 102n, under the control of a centralized controller 103, both singularly and in combination. Further, service 102 may be regarded as a cloud-based service, whereby shared resources, software, and information (i.e., phone numbers) are provided to computers and other devices as a utility over a network (i.e., the Internet).

Controller 103 may be configured as software, hardware, or firmware to coordinate distribution of changeable phone numbers for subscribers to service 102. Controller 103 may be further configured to forward an incoming call for a subscribing mobile phone to a changeable phone number that has been assigned to the subscribing mobile phone for a time frame concurrent with the incoming call.

Cell site 104 may refer to a site at which antennas and electronic communications equipment are placed, e.g., a radio mast, tower or other high place (e.g., building), to create a cell in a cellular network. As implementations of masking phone numbers, as disclosed herein, are intended to be utilized for any mobile phone technology, e.g., GSM, CDMA, etc., cell site 104 may refer to a base station site, which hosts multiple base stations serving multiple mobile phone technologies.

Mobile phone 106 may refer to an electronic device that can make and receive telephone calls over a radio link while moving around a wide geographic area by connecting to a cellular network provided by a wireless service provider. The aforementioned wireless service provider may also be known as a mobile network carrier, wireless carrier, or even cellular company. Regardless of the alternate reference, the wireless service provider provides services for mobile phone subscribers.

Mobile phone 106 may be assigned a static phone number by the wireless service provider, and calls may be received on mobile phone 106 when the static phone number is dialed by a separate phone device. Further, when a call is made from mobile phone 106, it is the assigned static phone number that is presented to, and displayed by, the caller identification service, i.e., caller ID, hosted by the receiving phone.

Mobile phone 106 may be communicatively coupled to cell site 104 by any mobile phone technology, e.g., GSM, CDMA, etc., depending upon the wireless service provider. Further, mobile phone 106 may be communicatively coupled to service 102 over a network, i.e., the Internet.

Figure 2:
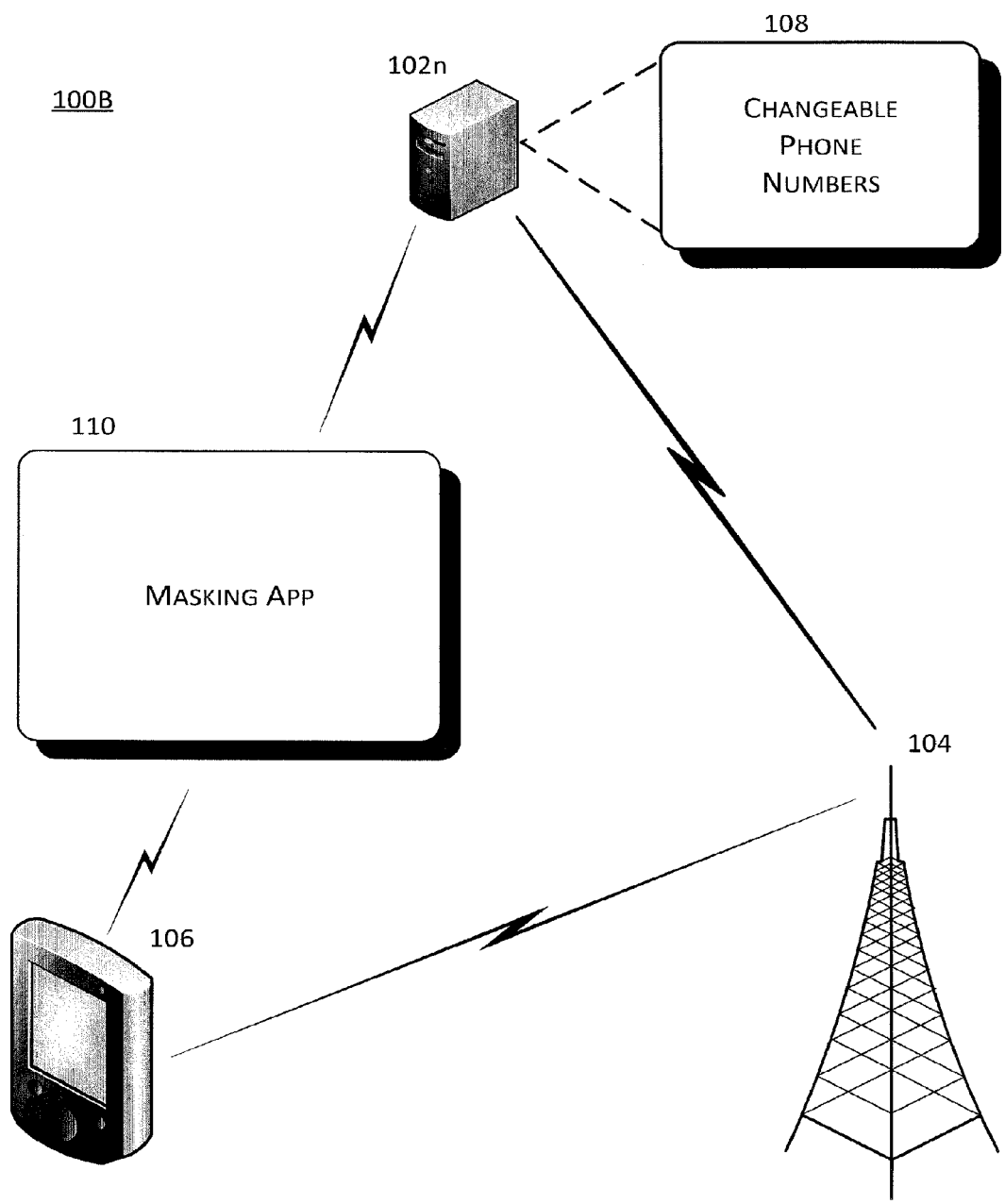
FIG. 2 shows an example communication system configuration in which masking phone calls may be implemented, arranged in accordance with at least some embodiments described herein.

FIG. 2 shows an example communication system configuration 200 in which masking phone calls may be implemented, arranged in accordance with at least some embodiments described herein. More specifically, configuration 200 references the communication system configuration shown in, and described with regard to, FIG. 1.

Any of servers 102a, 102b, . . . , 102n, hosted at service 102 and controlled by a centralized controller, may store a large number of changeable telephone numbers 108, e.g., on the order of hundreds of thousands, to share among subscribers to service 102. Significant portions of the changeable telephone numbers 108, if not all, stored on one or more of servers 102a, 102b, . . . 102n may be assigned to mobile phone 106.

A masking application 110 may represent a software application that may be hosted on either service 102 or mobile phone 106. Masking application 110 may be an open source application, available for validation, which may be downloaded to mobile phone 106 upon subscription, paid or free, to service 102 for masking phone numbers. Alternatively, masking application 110 may be hosted in the cloud as part of, or even separate from, service 102. The description that follows describes masking application 110 being hosted on mobile phone 106, although specific descriptions will be made if there are distinctions applicable to when masking application 110 is hosted in the cloud.

Masking application 110, hosted on mobile phone 106, may serve as a portal for the changeable phone numbers 108 to be downloaded from one or more of servers 102a, 102b, . . . 102n hosted at service 102. Alternatively, masking application 110, hosted on mobile phone 106, may be communicatively coupled to service 102 such that mobile phone 106 has constant, i.e., uninterrupted, access to the changeable phone numbers 108 stored on one or more of servers 102a, 102b, . . . 102n.

Masking application 110, hosted in the cloud as part of, or even separate from, service 102 may be utilized to download the changeable phone numbers 108 from on one or more of servers 102a, 102b, . . . 102n to a memory on mobile phone 106 or, alternatively, be communicatively coupled to mobile phone 106 such that mobile phone 106 has constant, i.e., uninterrupted, access to the changeable phone numbers 108 stored on one or more of servers 102a, 102b, . . . 102n.

Figure 3:
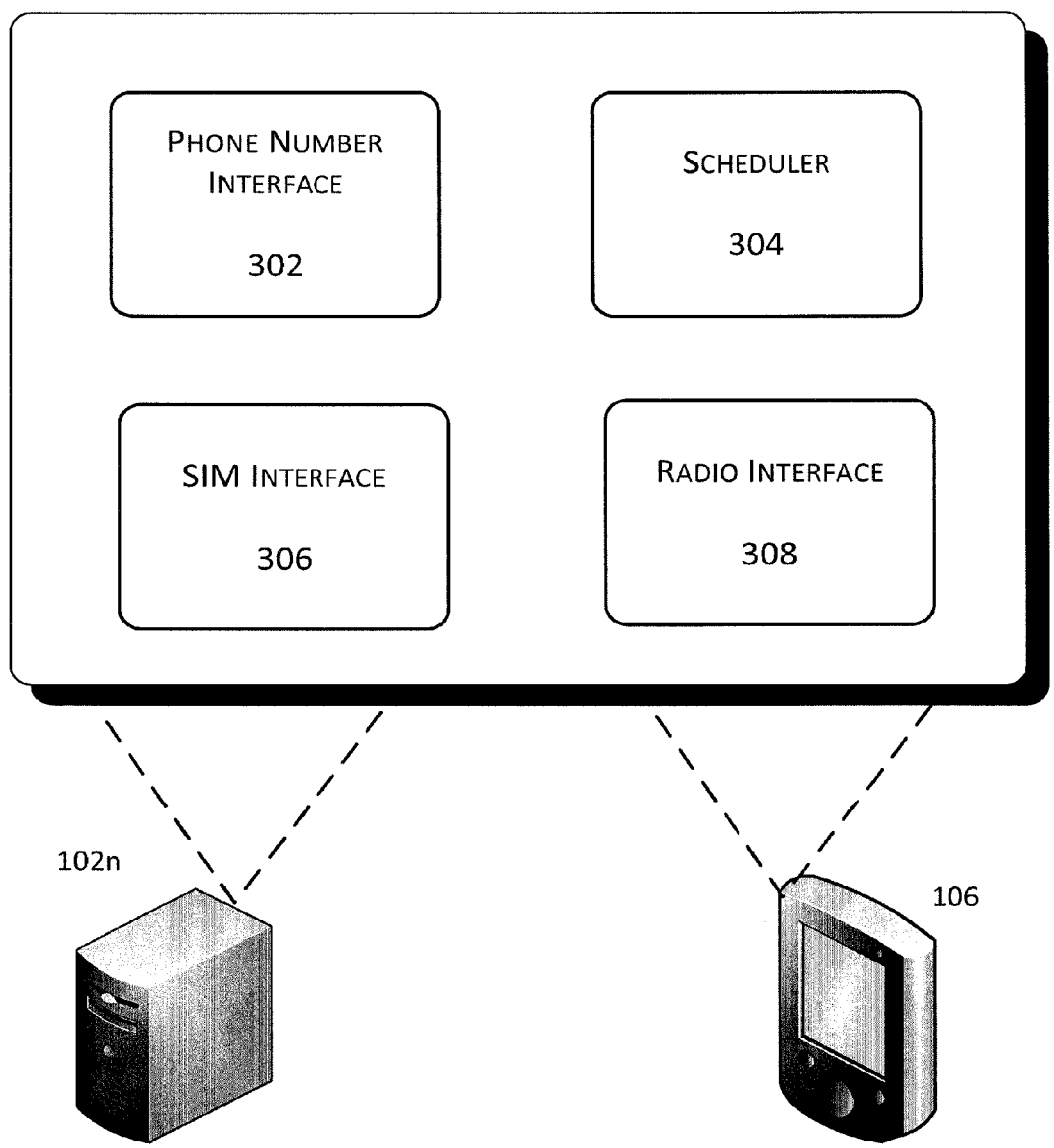
FIG. 3 shows an example configuration of a masking application, in accordance with at least the example of FIG. 2, arranged in accordance with at least some embodiments described herein.

FIG. 3 shows an example configuration 300 of masking application 110, in accordance with at least the example of FIG. 2, arranged in accordance with at least some embodiments described herein. Masking application 110, which may include various components or modules, e.g., implemented by one or more computer-readable media including but not limited to Application Specific Integrated Circuit (ASIC) or Customer Specific Integrated Circuit (CSIC), may include, at least, a phone number interface 302, a scheduler 304, a SIM interface 306, and/or a radio interface 308. Further, masking application 110 is not limited to such components or modules, as obvious modifications may be made by adding further components or modules or even eliminating at least one of the components or modules described here or even by having various components or modules assuming roles accorded to other components or modules in the following description.

Further still, as depicted in FIG. 3, masking application 110 may be hosted on either of mobile phone 106 or on one or more of servers 102a, 102b, . . . 102n at service 102. In addition, masking application 110 is to be registered with service 102 for masking phone numbers. In particular, masking application 110 hosted on, or otherwise associated with mobile phone 106, may be registered with service 102 with the intent of masking the static phone number assigned to mobile phone 106 for both incoming and outgoing calls.

Phone number interface 302 may represent a component or module to interface with changeable phone numbers 108 that are downloaded to a memory on, or otherwise assigned to, mobile phone 106. More particularly, phone number interface 302 may provide access to one of the plurality of changeable phone 108 numbers that may be assigned to mobile phone 106 for a specific time frame, whether the changeable phone numbers 108 are downloaded to a memory on mobile phone 106 or remain stored on one or more of servers 102a, 102b, . . . 102n at service 102.

Scheduler 304 may represent a component or module that assigns the plurality of changeable phone numbers 108, which has been dedicated to the static phone number of mobile phone 106, for respective time frames. The respective time frames may begin at the time of service initiation for mobile phone 106, and may last for a duration to be determined by the user of the mobile phone 106 or by an operator or facilitator of service 102. As a non-limiting example, the respective time frames may be 11 seconds, meaning that, every 11 seconds, a new one of the changeable phone numbers 108 is assigned, for masking purposes, to the static number of mobile phone 106.

SIM interface 306 may represent a component or module that changes the identity of mobile phone 106 to that of the assigned one of changeable phone numbers 108 that has been assigned to mobile phone 106 for a respective time frame. For example, GSM phones, as well as some CDMA phones, use SIM (subscriber identity module) cards, or similar devices, to store subscription information for the respective mobile phone. Thus, SIM interface 306 may interact with the SIM or R-UIM (removable user identity module) card on mobile phone 106 to change the identity, i.e., phone number, for mobile phone 106 during a current time frame. Accordingly, in the just-described example, SIM interface 306 may synchronize with the SIM or R-UIM card of mobile phone 106 to assign a new one of changeable phone numbers 108 to mobile phone 106 every 11 seconds.

Radio interface 308 may represent a component or module that synchronizes with a radio transceiver on mobile phone 106 to register the identity, i.e., phone number, of mobile phone 106 with cell site 104 at regular time increments. In accordance with the just-described example, radio interface 308 may synchronize with the radio transceiver on mobile phone 106 at least every 11 seconds to register a newly assigned identity, i.e., phone number, of mobile phone 106 with cell site 104.

In accordance with accepted practices, cell site 104, with which mobile phone 106 is registered, may be regarded as the geographically closest cell site in proximity to mobile phone 106. However, alternate embodiments of masking phone numbers may contemplate radio interface 308 directing the radio transceiver of mobile phone 106 to register the newly assigned identity, i.e., phone number, of mobile phone 106 with a cell site that is not the closest in proximity thereto but rather to a more distant cell site.

Figure 4:
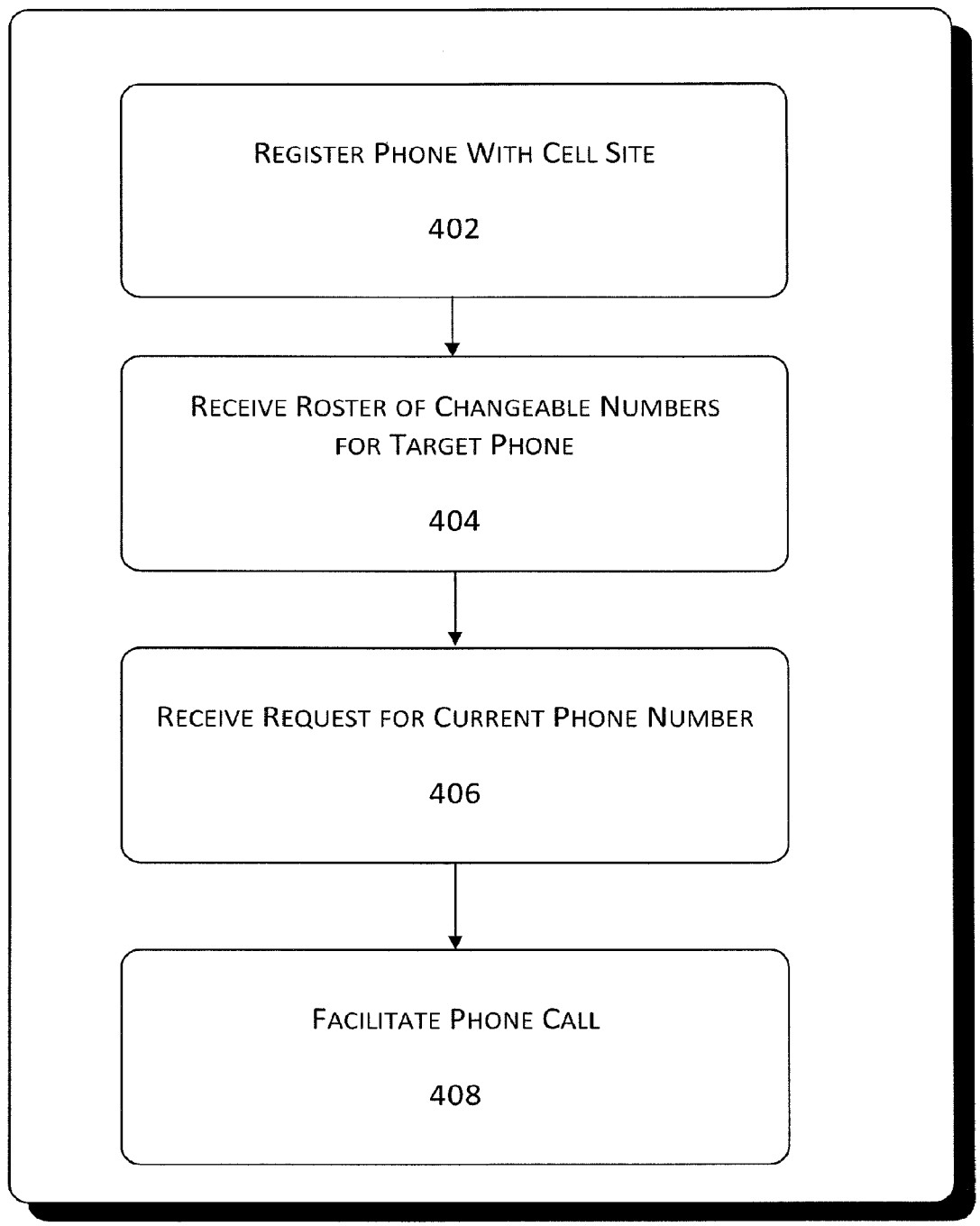
FIG. 4 shows an example processing flow of a masking application, in accordance with at least the examples of FIGS. 2 and 3, arranged in accordance with at least some embodiments described herein.

FIG. 4 shows an example processing flow 400 of a masking application, in accordance with at least the examples of FIGS. 2-3, arranged in accordance with at least some embodiments described herein.

Processing flow 400 may include various operations, functions, or actions as illustrated by one or more of blocks 402, 404, 406, and/or 408.

More particularly, processing flow 400 describes sub-processes executed by various components that are part of masking application 110. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description.

Further, processing flow 400 may refer to a process that occurs after mobile phone 106 has been registered with service 102 for the purpose of masking phone numbers, i.e., the static phone number assigned to mobile phone 106, for incoming calls to mobile phone 106 and for outgoing calls from mobile phone 106.

Block 402 (register phone with cell site) may refer to radio interface 308 synchronizing with a radio transceiver on mobile phone 106 to register the identity, i.e., phone number, of mobile phone 106 with cell site 104 at regular time increments. If mobile phone 106 has already been subscribed to service 102 and/or is currently roaming from a cell corresponding to another cell site, the synchronization with cell site 104 may include registering the currently assigned one of changeable phone numbers 108 for the current time frame.

However, an initial synchronization may include radio interface 308 synchronizing with the radio transceiver on mobile phone 106 to register the static phone number assigned to mobile phone 106 with cell site 104. Processing flow 400 may proceed to block 404.

Block 404 (receive roster of changeable numbers for target phone) may refer to phone number interface 302 interfacing with changeable phone numbers 108 that are downloaded to a memory on mobile phone 106 or remain stored on one or more of servers 102a, 102b, . . . , 102n at service 102.

Subsequent to interfacing with changeable phone numbers 108, masking application 110, particularly scheduler 304, may assign respective ones of changeable phone numbers 108 to time frames throughout an extended period of time, e.g., days, weeks, or months. Revisiting the example utilized above, if scheduler 304 assigns a new one of changeable phone numbers 108 to the static phone number of mobile phone 106 every 11 seconds, mobile phone 106 may be assigned a new identity, i.e., phone number, 7,854 times a day. Assuming that there are an even 100,000 changeable phone numbers 108 stored on one or more of servers 102a, 102b, . . . , 102n, scheduler 304 would not repeat an assignment of one of changeable phone numbers 108 to the static phone number of mobile phone 106 more than once every 12.7 days. Processing flow 400 may proceed to block 406.

Block 406 (receive request for current phone number) may refer to masking application 110, hosted either on mobile phone 106 or service 102, receiving a request from controller 103 at service 102 for the currently assigned on of changeable phone numbers 108 for the static phone number of mobile phone 106.

That is, the masking of the phone number for an incoming call to mobile phone 106 includes all calls intended for the static phone number of mobile phone 106 being diverted to service 102. Controller 103 then synchronizes with masking application 110, including scheduler 304, to determine the current one of changeable phone numbers 108 assigned to the static phone number of mobile phone 106. Since the currently assigned one of changeable phone numbers 108 has been registered with cell site 104, service 102 forwards the incoming call intended for the static phone number of mobile phone 106 to cell site 104. The call is then relayed to mobile phone 106 using the currently assigned one of changeable phone numbers 108.

Similarly, during such a time frame when the static phone number of mobile phone 106 is masked with one of changeable phone numbers 108 for incoming calls, outgoing calls from mobile phone 106 are also masked. That is, an outgoing call from mobile phone 106 may be identified at the receiving end thereof by the currently assigned one of changeable phone numbers 108 since the identity, i.e., assigned to the SIM or U-RIM has been changed accordingly. Processing flow 400 may proceed to block 408.

Block 408 (facilitate phone call) may refer to controller 103 determining, upon forwarding the call to cell site 104, whether the call to mobile phone 106 should be completed. This determination may be made based on an examination of the user of the currently assigned one of changeable phone numbers 108. As stated above, changeable phone numbers 108 may be provided on the magnitude of hundreds of thousands, and may be assigned to a multitude of subscribers to service 102. Thus, though the mathematical probabilities are overwhelmingly against concurrent, or even substantially concurrent, usage of a same one of changeable phone numbers 108, controller 103 may cut off, delay, or otherwise divert a call to a currently assigned one of changeable phone numbers 106 if that number is currently, or substantially currently, assigned to another subscriber to service 102.

As a result, the user/owner of mobile phone 106 may attain a high level of anonymity as the changeable phone number assigned to mobile phone 106 will change upon passage of the next time frame, e.g., 11 seconds, which is likely to pass before a next call is made to mobile phone 106. Accordingly, not even the wireless service provider or mobile network carrier is able to track calls to mobile phone 106 since the identity, i.e., phone number, thereof is constantly changing.

Figure 5:
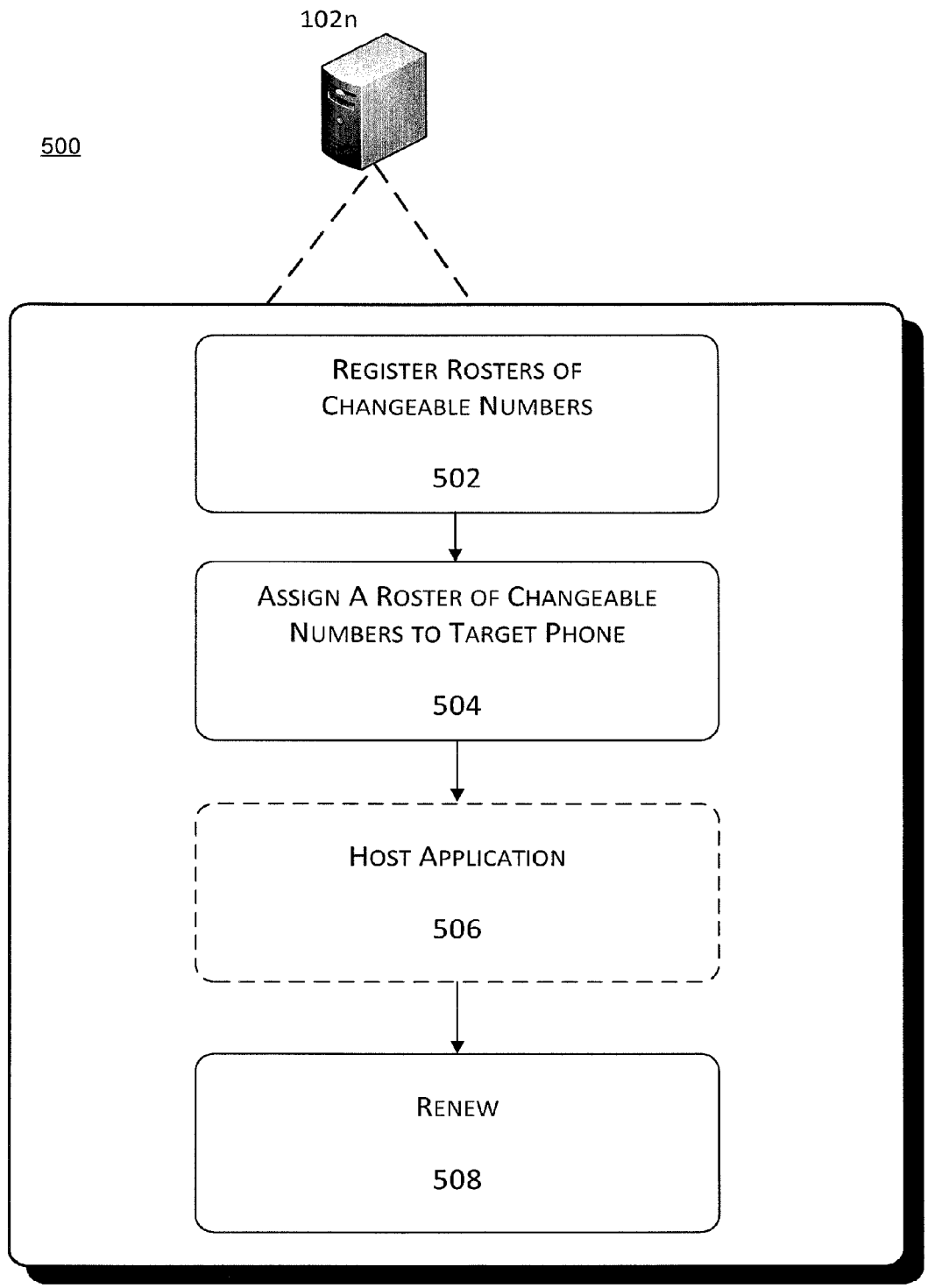
FIG. 5 shows an example processing flow of a masking service in accordance with at least the examples of FIGS. 2-4, arranged in accordance with at least some embodiments described herein.

FIG. 5 shows an example processing flow 500 of a masking service 102 in accordance with at least the examples of FIGS. 2-4, arranged in accordance with at least some embodiments described herein. Processing flow 500 may include various operations, functions, or actions as illustrated by one or more of blocks 502, 504, 506, and/or 508.

Processing flow 500 describes sub-processes executed by various components that are part of masking service 102. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description.

Block 502 (register rosters of changeable numbers) may refer to controller 103 acquiring and registering rosters of changeable phone numbers 108 for subscribers of service 102. Processing flow 500 may proceed to block 504.

Block 504 (assign a roster of changeable numbers to target phone) may refer to controller 103 assigning all or portions of changeable phone numbers 108 to mobile phone 106. Again, changeable phone numbers 108 may number in the hundreds of thousands, and therefore days or even weeks or months may pass before any one of changeable phone numbers 108 is repeated for mobile phone 106. Thus, practical, technical considerations may be utilized in determining just how many of changeable phone numbers 108 are to be assigned to mobile phone 106 or any other targeted ones of mobile phones. Processing flow 500 may proceed to block 506.

Block 506 (host application) may refer to masking application 110 being hosted on one or more of servers 102a, 102b, . . . , 102n on service 102. Thus, synchronization with various components or modules of mobile phone 106 may be implemented from the cloud. However, processing at block 506 may be regarded as optional as it is more likely, though not exclusively so, that masking application 110 is hosted on mobile phone 106. Regardless of where masking application 110 is hosted, processing for masking phone numbers may be implemented as described with reference to FIG. 4. Processing flow 500 may continue to block 508.

Block 508 (renew) may refer to the roster of changeable phone numbers 108 being renewed for mobile phone 106 or any other mobile phone that subscribes to service 102. Motivation for such renewal may be rooted in security purposes for a personal, corporate, military, or national security nature, so that a changeable phone number is never repeated for mobile phone 106.

Figure 6:
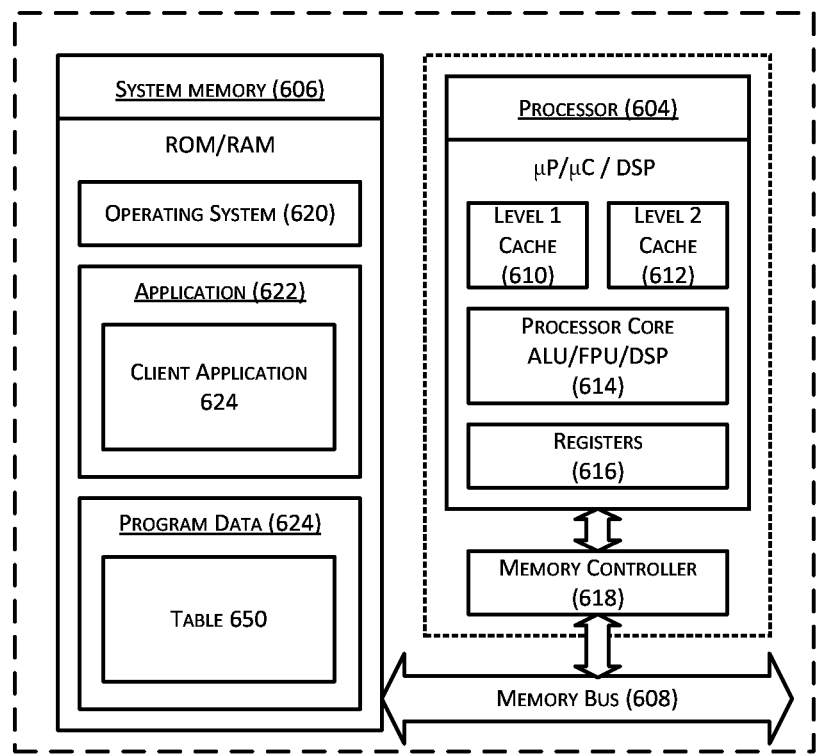
FIG. 6 shows a block diagram illustrating an example computing device by which various example solutions described herein may be implemented, arranged in accordance with at least some embodiments described herein.

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a mobile unit, a network element, and/or any other computing device, particularly as applicable to the applications and/or programs described above corresponding to the configuration 100 for masking phone numbers.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include the aforementioned masking application 110 that is arranged to perform the functions for masking phone numbers, which are described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as mobile phone 106 or, alternatively, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A non-transitory computer-readable medium to store one or more executable instructions that, when executed, cause one or more processors to:

register a static phone number of a communication device with a local cell site, wherein the communication device is associated with the static phone number;

receive a roster of changeable phone numbers that are assignable to the communication device; download the roster of changeable phone numbers to the communication device;

assign at least one of the changeable phone numbers to the communication device for a respective time frame of a predetermined duration as a current dialing number of the communication device for the respective time frame, and wherein the communication device changes the current dialing number of the communication device to that of the assigned one of the changeable phone numbers;

register the current dialing number of the communication device with the local cell site for each of the assigned changeable phone numbers for the respective time frame such that an incoming call for the static phone number is forwarded to the local cell site with which a current dialing number of the communication device at the time of the incoming call is registered;

receive a request for the current dialing number that is assigned to the communication device for a current time frame; and facilitate a phone call intended for the communication device assigned the current dialing number for the current time frame, wherein the phone call intended for the communication device includes a phone call that is intended for the static phone number and is forwarded to the current dialing number.

2. The non-transitory computer-readable medium of claim 1, wherein the computer-readable medium is hosted on a target phone.

3. The non-transitory computer-readable medium of claim 1, wherein the computer-readable medium is hosted on a cloud-based server.

4. The non-transitory computer-readable medium of claim 1, wherein each of the changeable phone numbers that are assignable to the static phone number rotates based on a passage of time within a particular time range.

5. The non-transitory computer-readable medium of claim 4, wherein the one or more executable instructions that, when executed, cause the one or more processors to receive the request further cause the one or more processors to register the assigned one of the changeable phone numbers for the current time frame with the local cell site.

6. The non-transitory computer-readable medium of claim 4, wherein the one or more executable instructions that, when executed, cause the one or more processors to facilitate the phone call further cause the one or more processors to enable the phone call in response to the assigned one of the changeable phone numbers for the current time frame is not currently being used.

7. The non-transitory computer-readable medium of claim 4, wherein the one or more executable instructions that, when executed, cause the one or more processors to facilitate the phone call further cause the one or more processors to disable the phone call in response to the assigned one of the changeable phone numbers for the current time frame is currently being used.

8. The non-transitory computer-readable medium of claim 1, wherein the roster of changeable phone numbers are downloaded to one or more of a plurality of communication devices, and changeable phone numbers are assignable to the one or more of the plurality of communication devices, including the communication device.

9. A system, comprising:

a server configured to provide a plurality of changeable phone numbers for a plurality of communication devices;

an application, configured to be hosted on each of the communication devices or on the server, further configured to:

assign at least a portion of the plurality of changeable phone numbers to one or more of the communication devices on a rotating basis, wherein the one or more of the communication devices are associated with one or more static phone numbers, and handshake with a local cell site on a continuing basis, wherein the handshake includes:

registering the one or more static phone numbers with the local cell site, and registering a current one of the portion of the plurality of changeable phone numbers with the local cell site for a current time frame such that an incoming call for the one or more static phone numbers is forwarded to the local cell site with which a current one of the portion of the plurality of changeable phone numbers of the communication devices at the time of the incoming call is registered; and a communication device, to which a static phone number is assigned, configured to:

download, from the server, the plurality of changeable phone numbers, and receive calls that are intended for the static phone number and are forwarded to the current one of the plurality of changeable phone numbers.

10. The system of claim 9, wherein the server is integrated as part of a cloud-based service.

11. The system of claim 9, wherein the server and the application are independent of a mobile telephone service provider.

12. The system of claim 9, wherein the communication device is further configured to receive a call that is forwarded to the one of the portion of the plurality of changeable phone numbers that has been currently registered with the local cell site, by the application, for the current time frame.

13. The system of claim 12, wherein the application is further configured to block the call in response to the application determining that the one of the portion of the plurality of changeable phone numbers currently registered with the local cell site has been used by another of the plurality of communication devices within a particular time frame.

14. A communication device, comprising:

a memory device configured to:

store an assigned static phone number, and store a plurality of available dialing numbers;

a SIM module configured to change a current dialing number of the communication device among the plurality of available dialing numbers upon passage of a particular amount of time; and a masking module configured to register the static phone number with a local cell site and further register the current dialing number of the communication device upon passage of the particular amount of time with the local cell site such that an incoming call for the static phone number is forwarded to the local cell site with which a current dialing number of the communication device at the time of the incoming call is registered, wherein the communication device is further configured to receive calls that are intended for the static phone number and are forwarded to the current dialing number.

15. The communication device of claim 14, wherein a predetermined amount of time is less than 10 seconds.

16. The communication device of claim 14, wherein the SIM module is assigned a plurality of available dialing numbers by a masking service that is independent of a mobile communication service provider.

* * * * *